UNITED STATES PATENT OFFICE.

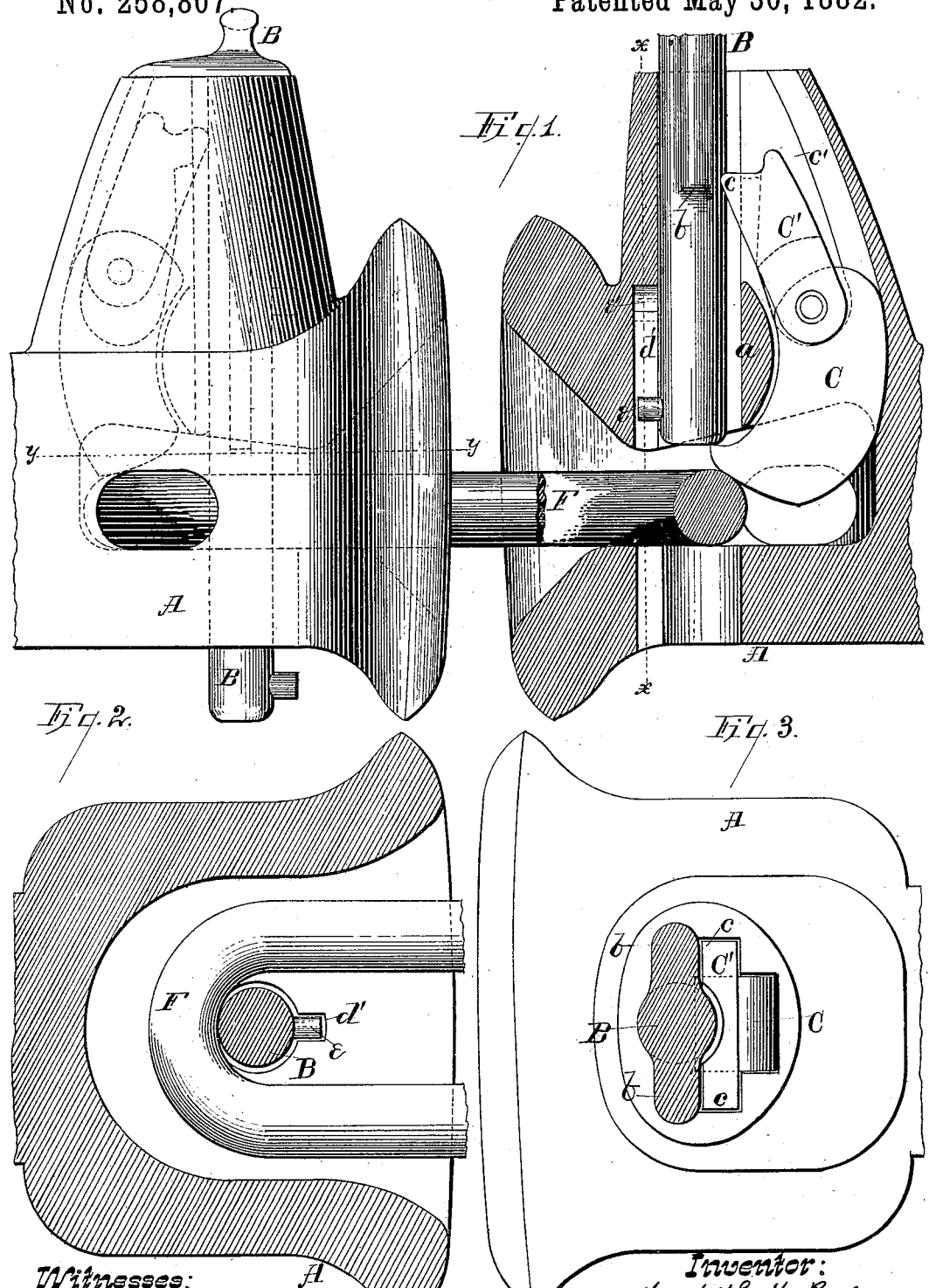

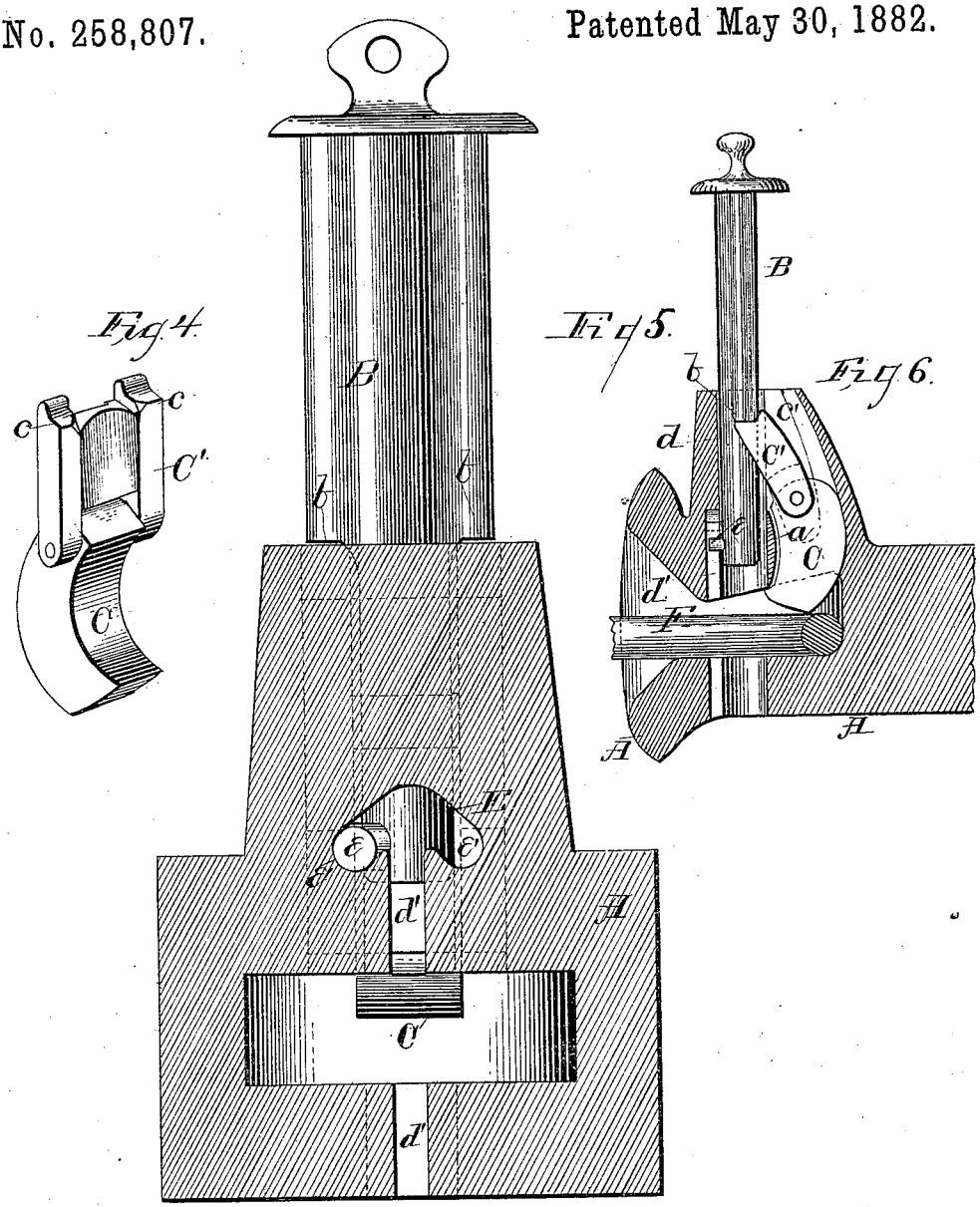

HORATIO G. H. REED, OF MILWAUKEE, WISCONSIN.

CAR-COUPLING.

SPECIFICATION forming part of Letters Patent No. 258,807, dated May 30, 1882.

Application filed March 30, 1882. (No model.)

*To all whom it may concern:*

Be it known that I, HORATIO G. H. REED, of Milwaukee, in the county of Milwaukee, and in the State of Wisconsin, have invented certain new and useful Improvements in Car-Couplings; and I do hereby declare that the following is a full, clear, and exact description thereof.

My invention relates to car-couplings, and is particularly designed as an improvement upon those used on freight-cars.

In the drawings, Figure 1 is a view of two draw-heads, one shown in side elevation with the link held in by the pin, and the other in vertical longitudinal section, showing the position of the parts when set for coupling. Fig. 2 is a horizontal section of a draw-head on the line $y\ y$ of Fig. 1; Fig. 3, a plan of the draw-head, showing the coupling-pin in section. Fig. 4 is a detail. Fig. 5 is a section embodying my improvement, taken through line $x\ x$, Fig. 1, with the coupling-pin in a different position; and Fig. 6 is a view like that shown at the right of Fig. 1, except that the link is shown in place, but the parts are set for uncoupling.

A A are the draw-heads, and B B the coupling-pins. C is a curved pawl, adapted to work between the rear wall of the mouth of the draw-head and a partition, $a$, curved on its rear side to fit into the concave of the pawl. To the upper end of the pawl C, I hinge a dog, C′, that has sides that project out beyond the sides of the pawl, and when the pawl and this dog are in place the projecting sides slide up and down in pockets $c'$ in each side of the pin-guide $d$. These pockets incline forward, so as to have a continual tendency to throw the upper end of the dog C′ toward the aperture in which the pin works, so that when the pin is raised high enough the upper end of the dog will fall forward, and as its face is concaved its flanges $c\ c$ will project under the wings $b\ b$ of the pin B and suspend it in the position shown in Fig. 6 until the link F may be withdrawn. Then the falling of the pawl will cause the dog to drop also, and as the front of the pocket is inclined it will guide the dog C′ out from under the wings of the pin and permit the pin to drop until it reaches the point of the pawl C, which will support it, as shown in Fig. 1, until an entering link trips the pawl out of the way, when the pin will drop through the link and couple. Now, when it is desired to uncouple the cars and yet leave them together, it is only necessary to raise the pin until the flanges $c\ c$ of the dog C′ fall forward under its wings, in which position the parts will remain, as shown in Fig. 6, until the withdrawal of the link, when the point of the pin will fall to the point of the pawl, as before stated, and the device will be set for automatic coupling whenever the link may be reinserted. To prevent the pin from being lost, I drive a small bolt, $e$, in its lower end, and provide a recess, $d'$, extending up through the front wall of the draw-head to a point just beneath the pin-guide, and here I provide a heart-shaped recess, E, its lower edges, forming pockets $e'\ e'$, one on each side of the long recess, as shown in Fig. 5, into one of which, by slightly turning the pin B when raised to its highest point, I can drop the bolt $e$, where it will sustain the pin and prevent it from dropping through the link when automatic coupling is not desirable.

The flanges $c\ c$, as they rest in the bottom of the pockets in which they slide, will suspend the pawl C above the bottom of the draw-head when the link is not in place; but when the link is in place the pawl will rest upon it and serve to hold it in a horizontal position that it may be guided into the opposing draw-head.

What I claim as my invention, and desire to secure by Letters Patent, is—

1. The combination of the pawl C, adapted to slide in a curved way, with a dog hinged to it and adapted to slide up and down in inclined pockets in the pin-guide above the curved way, and to suspend it (the pawl C) in position to carry its lower end or point under the pin-hole and out of contact with the bottom of the throat of the draw-head, but in position to be tripped from beneath the pin by an entering link, as set forth.

2. The sliding block and a dog hinged to it, both working in suitable guides, in combination with a pin having wings adapted to rest on flanges of the dog, which when the link is beneath the pawl will prevent the pin from falling through the link, as set forth.

3. The combination of the pin, having a short bolt in its lower end, with the draw-head, having the vertical recess $e$ and heart-shaped recess E $e'$ $e'$, as set forth.

In testimony that I claim the foregoing I have hereunto set my hand this 13th day of March, 1882.

HORATIO G. H. REED.

Witnesses:
   STANLEY S. STOUT,
   HAROLD G. UNDERWOOD.